United States Patent [19]

Tsai

[11] Patent Number: 5,513,302
[45] Date of Patent: Apr. 30, 1996

[54] DUAL PURPOSE PRINTER INTERFACE DEVICE CAPABLE OF CONNECTING A PRINTER AND A JOYSTICK TO A PORTABLE HOST COMPUTER

[75] Inventor: Hsi-Jung Tsai, Pan-Chiao, Taiwan

[73] Assignee: Winbond Electronics Corp., Hsinchu, Taiwan

[21] Appl. No.: 342,866

[22] Filed: Nov. 21, 1994

[51] Int. Cl.$^6$ .................................................. G06K 15/00
[52] U.S. Cl. ............................................ 395/114; 395/106
[58] Field of Search ............................. 395/112, 114, 395/101, 500, 100, 306, 106; 345/161, 163, 167; 348/6, 13, 552; 364/710.13

[56] References Cited

U.S. PATENT DOCUMENTS

| | | | |
|---|---|---|---|
| 4,884,223 | 11/1989 | Ingle et al. | 364/550 |
| 5,307,295 | 4/1994 | Taylor et al. | 364/578 |
| 5,353,417 | 10/1994 | Fuoco et al. | 395/325 |
| 5,396,546 | 3/1995 | Remillard | 379/96 |
| 5,404,393 | 4/1995 | Remillard | 379/96 |

*Primary Examiner*—Raymond J. Bayerl
*Assistant Examiner*—Dov Popovici
*Attorney, Agent, or Firm*—Harness, Dickey & Pierce

[57] ABSTRACT

A dual purpose printer interface device includes a printer interface circuit connected to a host computer and a printer connector to which a printer is to be connected. An adaptor can connect removably a joystick to the connector. A joystick interface circuit is connected to the computer and the connector. A first selecting unit connects electrically the computer to the printer and joystick interface circuits and is operable selectively in a first mode, wherein the printer interface circuit is connected electrically to the computer and the joystick interface circuit is disconnected from the computer, and in a second mode, wherein the joystick interface circuit is connected electrically to the computer and the printer interface circuit is disconnected from the computer. A second selecting unit connects electrically the connector to the printer and joystick interface circuits. The second selecting unit is operable to connect electrically the printer interface circuit to the connector and to disconnect the joystick interface circuit from the connector when the first selecting unit is operated in the first mode and to connect electrically the joystick interface circuit to the connector and to disconnect the printer interface circuit from the connector when the first selecting unit is operated in the second mode.

2 Claims, 5 Drawing Sheets

| SIGNAL LINE | CONTACTS OF THE ADAPTOR | CONTACTS OF THE PRINTER CONNECTOR |
|---|---|---|
| VDD | 1, 8, 9, 15 | 1, 14, 15, 16, 17 |
| V0 | 3 | 2 |
| V1 | 6 | 3 |
| V2 | 11 | 4 |
| V3 | 13 | 5 |
| V4 | 2 | 6 |
| V5 | 7 | 7 |
| V6 | 10 | 8 |
| V7 | 14 | 9 |

FIG. 4

DUAL PURPOSE PRINTER INTERFACE DEVICE CAPABLE OF CONNECTING A PRINTER AND A JOYSTICK TO A PORTABLE HOST COMPUTER

BACKGROUND OF THE INVENTION

1. Field of the Invention

This invention relates to a printer interface device for a computer, more particularly to a dual purpose printer interface device capable of connecting a printer and a joystick to a portable host computer.

2. Description of the Related Art

Presently, a conventional portable host computer lacks a joystick interface device owing to insufficient space of the conventional portable host computer.

Referring to FIG. 1, a conventional printer interface device is shown to comprise a printer data register 11, a printer control register 12, a printer status register 13, an address decoder and read/write controller 14 and a bus driving means 15. The data register 11 has eight data transmission lines (P0–P7). The control register 12 has four control lines (STB,AFD,INIT,SLIN). The status register 13 has five status lines (ACK,BUSY,PE,SLCT,ERROR). The data, control and status registers 11,12 and 13 are connected electrically to a printer connector (A) which has twenty-five contacts. The printer connector (A) is to be connected to a printer (not shown). The conventional printer interface device is connected electrically to the address bus (SA0–SA9) of the conventional host computer (C) via the address decoder and read/write controller 14 and to the data bus (D0– D7) of the host computer (C) via the bus driving means 15. Operation of the controller 14 is controlled by an input/output read enabling signal (IOR) and an input/output write enabling signal (IOW) from the host computer (C).

Since the conventional portable host computer has an insufficient space for accommodating a conventional joystick interface device, and since the conventional printer interface device cannot function as a joystick interface device, there is a need to provide a dual purpose printer interface device which is capable of connecting a printer and a joystick to a portable host computer.

SUMMARY OF THE INVENTION

Therefore, the main objective of the present invention is to provide a dual purpose printer interface device which is capable of connecting a printer and a joystick to a portable host computer.

According to the present invention, a dual purpose printer interface device includes a printer connector which is to be connected to the printer. A printer interface circuit is connected to the printer connector and a host computer. The printer interface circuit is capable of transmitting printer data and control signals from the host computer to the printer via the printer connector and is capable of transmitting printer status signals from the printer to the host computer via the printer connector. An adaptor is capable of connecting removably a joystick to the printer connector. A joystick interface circuit is connected to the host computer and the printer connector. The joystick interface circuit is capable of transmitting joystick signals from the joystick to the host computer via the printer connector and the adaptor. A first selecting means connects electrically the host computer to the printer interface circuit and to the joystick interface circuit. The first selecting means is operable selectively in a first mode, wherein the printer interface circuit is connected electrically to the host computer and the joystick interface circuit is disconnected from the host computer, and in a second mode, wherein the joystick interface circuit is connected electrically to the host computer and the printer interface circuit is disconnected from the host computer. A second selecting means connects electrically the printer connector to the printer interface circuit and to the joystick interface circuit. The second selecting means is operable to connect electrically the printer interface circuit to the printer connector and to disconnect the joystick interface circuit from the printer connector when the first selecting means is operated in the first mode and to connect electrically the joystick interface circuit to the printer connector and to disconnect the printer interface circuit from the printer connector when the first selecting means is operated in the second mode.

BRIEF DESCRIPTION OF THE DRAWINGS

Other features and advantages of the present invention will become apparent in the following detailed description of the preferred embodiment with reference to the accompanying drawings, of which:

FIG. 4 is a table illustrating the relationship between certain signal lines and certain contacts of the adaptor and the printer connector.

DETAILED DESCRIPTION OF THE PREFERRED EMBODIMENT

Figure 1:
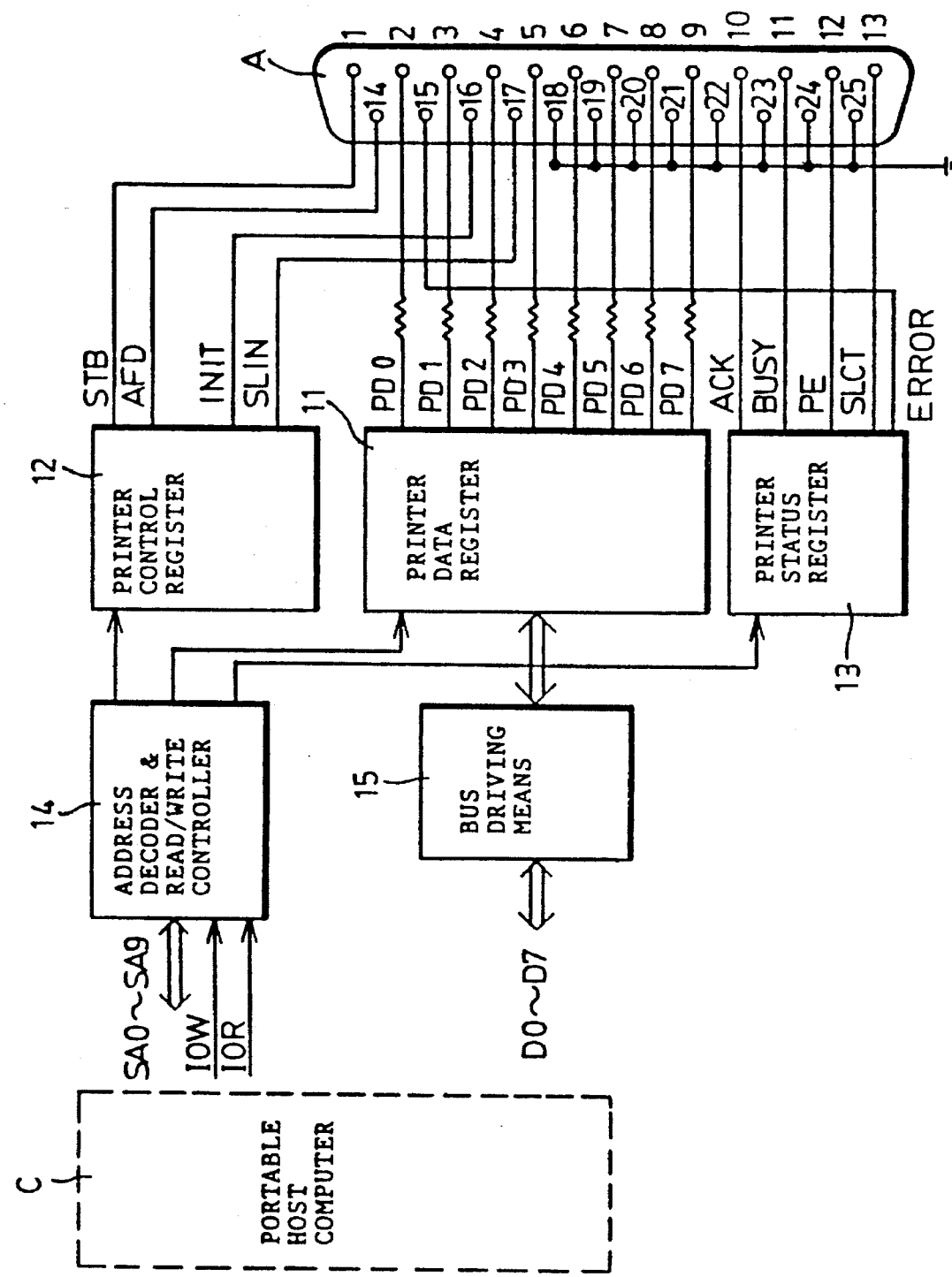
FIG. 1 is a schematic block diagram illustrating a conventional printer interface device which is connected to a conventional portable host computer.
Figure 2:
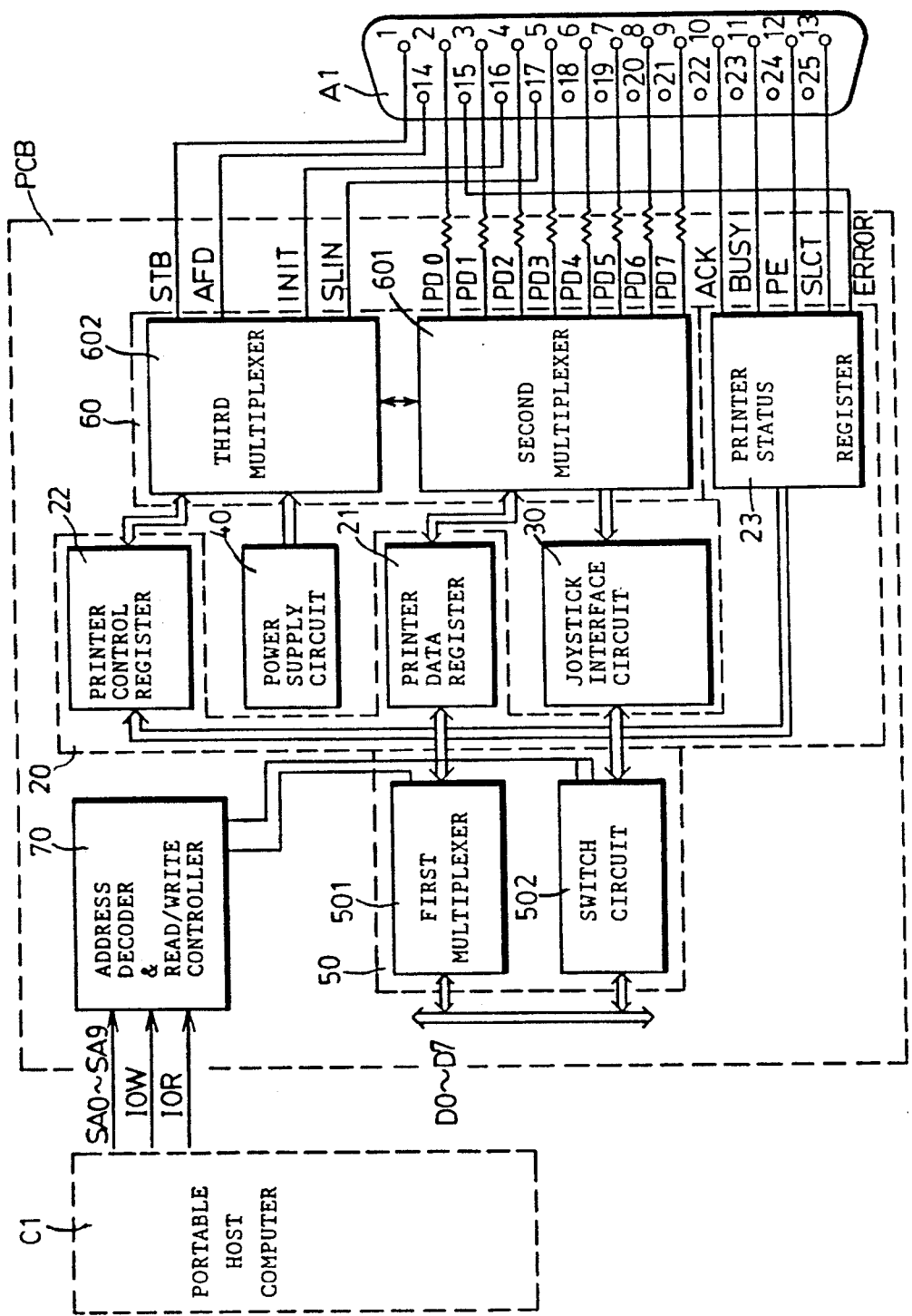
FIG. 2 is a schematic block diagram illustrating a dual purpose printer interface device according to the present invention, the dual purpose printer interface device being connected electrically to a portable host computer.

Referring to FIG. 2, a dual purpose printer interface device according to the present invention includes a printer connector (A1), an address decoding and read/write controller 70, a printer interface circuit 20, an adaptor (B) (FIG. 3), a joystick interface circuit 30, a power supply circuit 40, a first selecting means 50 and a second selecting means 60.

The address decoder and read/write controller 70 is connected electrically to a portable host computer (C1) in a conventional manner similar to that described beforehand.

Figure 5:
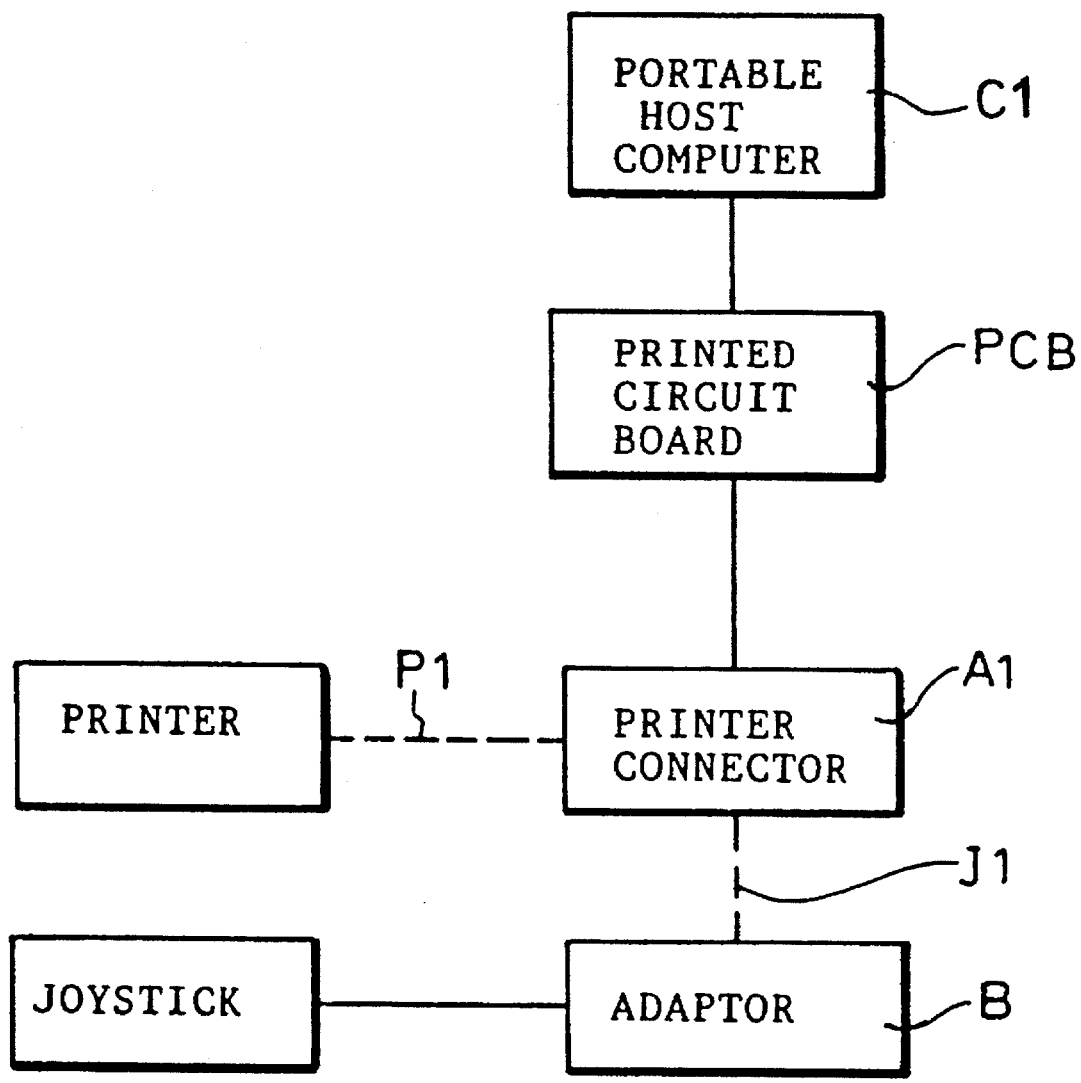
FIG. 5 is a schematic block diagram showing the interconnection of a joystick, printer, joystick adapter, primer connector, common primed circuit board and host computer all in accordance with the present invention.

The printer connector (A1) has twenty-five contacts and is to be connected to a printer as shown in FIG. 5.

The printer interface circuit 20 and the joystick interface circuit 30 are mounted on a common printed circuit board (PCB). The printer interface circuit 20 includes a printer data register 21, a printer control register 22 and a printer status register 23. The data register 21 and the control register 22 are connected electrically to the controller 70. The status register 23 is connected directly and electrically to the printer connector (A1) via five status lines (ACK,BUSY,PE, SLCT,ERROR).

The first selecting means 50 includes a first multiplexer 501 and a switch circuit 502. Both the first multiplexer 501 and the switch circuit 502 are connected electrically to the host computer (C1) via the data bus (D0–D7) and are connected electrically to the controller 70. The first multiplexer 501 is also connected electrically to the data, control and status registers 21,22,23 of the printer interface circuit 20, while the switch circuit 502 is connected electrically to the joystick interface circuit 30. The first selecting means 50 is operable selectively in a first mode, wherein the first multiplexer 501 is operable to enable the host computer (C1) to transmit printer data and control signals respectively through the printer control and data register 22,21 and to receive printer status signals from the printer status register 23, and the switch circuit is operable to disconnect the joystick interface circuit 30 from the host computer (C1), and in a second mode, wherein the switch circuit 502 is operable to connect electrically the joystick interface circuit 30 to the host computer (C1), and the first multiplexer 501 prevents the host computer (C1) from transmitting the printer data and control signals respectively through the printer control and data registers 22,21 and to receive the printer status signals from the printer status register 23.

The second selecting means 60 includes a second multiplexer 601 and a third multiplexer 602. The second multiplexer 601 is connected electrically to the printer data register 21 and the joystick interface circuit 30 and is connected electrically to the printer connector (A1) via eight data transmission lines (PD0– PD7). The third multiplexer 602 is connected electrically to the printer control register 22 and the power supply circuit 40. The third multiplexer 602 is also connected to the printer connector (A1) via four control lines (STB,AFD,INIT,SLIN). The second selecting means 60 is operable to operate the second and third multiplexers 601,602 to connect respectively the data and control registers 21,22 to the printer connector (A1) and to disconnect respectively the joystick interface circuit 30 and the power supply circuit 40 from the printer connector (A1) when the first selecting means 50 is in the first mode to permit transmission of the printer data and control signals from the host computer (C1) to the printer. The second selecting means 60 is also operable to operate the second and third multiplexers 601,602 to connect respectively the power supply circuit 40 and the joystick interface circuit 30 to the printer connector (A1) and disconnect respectively the data and control registers 21,22 from the printer connector (A1) when the first selecting means 50 is in the second mode to permit the supply of power from the power supply circuit 40 to the joystick and the transmission of joystick signals from the joystick to the host computer (C1).

It should be noted that the operation of the first and second selecting means 50 and 60 is controlled by a control means (not shown) which may be a software driven or a manually operated unit, such as a mechanical switch unit. Since the structure of the control means is known in the art, a detailed description thereof is omitted herein.

Figure 3:
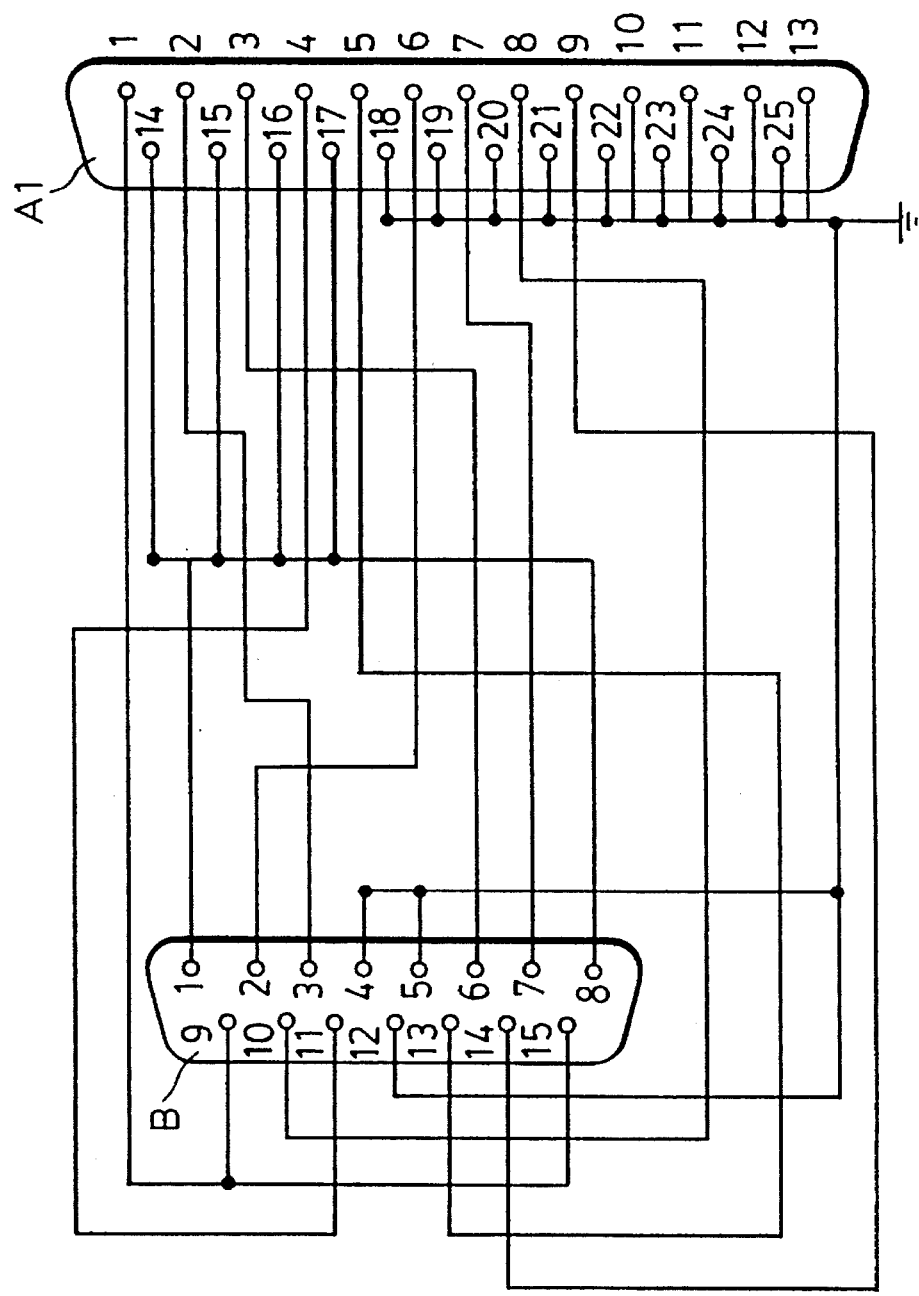
FIG. 3 is a schematic view showing the relationship between an adaptor and a printer connector.

Referring now to FIGS. 3 and 4, the adaptor (B) has fifteen contacts and is to be connected electrically to a joystick as shown in FIG. 5. The adaptor (B) is capable of connecting removably the joystick to the printer connector (A1) such that the joystick interface circuit 30 is capable of transmitting the joystick signals from the joystick to the host computer (C1) via the printer connector (A1) and the adaptor (B). To achieve this end, the required relationship between the contacts of the adaptor (B) and the contacts of the printer connector (A1) is shown in FIG. 3, while the required relationship between certain signal lines and certain contacts of the adaptor (B) and the printer connector (A1) is shown in FIG. 4.

Referring to FIGS. 2 and 5, in operation, when the host computer (C1) is to be used with a printer, the printer is connected to the printer connector (A1) as shown by dotted line (P1) in FIG. 5. Then, the control means is activated to operate the first selecting means 50 in the first mode such that the first multiplexer 501 enables the host computer (C1) to transmit the printer data and control signals respectively through the printer control and data registers 22,21 and to receive printer status signals from the printer status register 23. At the same time, the second selecting means 60 is controlled by the control means so that the second and third multiplexers 601,602 connect respectively the data and control registers 21,22 to the printer connector (A1) so as to permit transmission of the printer data and control signals from the host computer (C1) to the printer.

When the host computer (C1) is to be used with a joystick, the joystick is connected to the printer connector (A1) as shown by dotted line (J1) in FIG. 5 via the adaptor (B) (see FIG. 3). Then, the control means is activated to operate the first selecting means 50 in the second mode such that the switch circuit 502 connects electrically the joystick interface circuit 30 to the host computer (C1). At the same time, the second and third multiplexers 601,602 are operated to connect respectively the power supply circuit 40 and the joystick interface circuit 30 to the printer connector (A1) so as to permit the supply of power from the power supply circuit 40 to the joystick and the transmission of joystick signals from the joystick to the host computer (C1).

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A dual purpose primer interface device capable of connecting a printer and a joystick to a portable host computer, said printer interface device comprising:

a printer connector to be connected to said printer;

a printer interface circuit connected to said printer connector and said host computer, said printer interface circuit being capable of transmitting printer data and control signals from said host computer to said printer via said printer connector and being capable of transmitting printer status signals from said printer to said host computer via said printer connector;

an adaptor for removably connecting said joystick to said printer connector;

a joystick interface circuit connected to said host computer and said printer connector, said joystick interface circuit being capable of transmitting joystick signals from said joystick to said host computer via said printer connector and said adaptor;

a first selecting means connecting electrically said host computer to said printer interface circuit and to said joystick interface circuit, said first selecting means being operable selectively in a first mode, wherein said printer interface circuit is connected electrically to said host computer and said joystick interface circuit is disconnected from said host computer, and in a second mode, wherein said joystick interface circuit is connected electrically to said host computer and said printer interface circuit is disconnected from said host computer, said first selecting means including a first multiplexer and a switch circuit, said printer interface circuit including a printer control register, a printer data register and a printer status register, said printer control, data and status registers being connected electrically to said first multiplexer, said first multiplexer being operable to enable said host computer to transmit said printer data and control signals respectively through said printer control and data registers and to receive said printer status signals from said printer status register when said first selecting means is in said first mode, said joystick interface circuit being connected electrically to said switch circuit which is operable to connect electrically said joystick interface circuit to said host computer when said first selecting means is in said second mode; and a second selecting means connecting electrically said printer connector to said printer interface circuit and to said joystick interface circuit, said second selecting means being operable to connect electrically said printer interface circuit to said printer connector and to disconnect said joystick interface circuit from said printer connector when said first selecting means is operated in said first mode and to connect electrically said joystick interface circuit to said printer connector and to disconnect said printer interface circuit from said printer connector when said first selecting means is operated in said second mode.

2. A dual purpose printer interface device as claimed in claim 1, further comprising a power supply circuit, said second selecting means including second and third multiplexers, said second multiplexer connecting said joystick interface circuit and said data register to said printer connector and said third multiplexer connecting said control register and said power supply circuit to said printer connector, said printer status register being connected directly to said printer connector, said second and third multiplexers being operable to connect respectively said data and control registers to said printer connector and disconnect respectively said joystick interface circuit and said power supply circuit from said printer connector when said first selecting means is in said first mode to permit transmission of said printer data and control signals from said host computer to said printer, said second and third multiplexers being operable to connect respectively said power supply circuit and said joystick interface circuit to said printer connector and disconnect respectively said data and control registers from said printer connector when said first selecting means is in said second mode to permit supply of power from said power supply circuit to said joystick and transmission of said joystick signals from said joystick to said host computer.

* * * * *